United States Patent Office 3,754,055
Patented Aug. 21, 1973

3,754,055
CATIONIC VINYL-PYRIDINE COPOLYMERS AND PRODUCTS THEREOF
Alan Rembaum, Altadena, Calif., assignor to California Institute of Technology, Pasadena, Calif.
No Drawing. Continuation-in-part of application Ser. No. 763,938, Sept. 30, 1968. This application Dec. 28, 1970, Ser. No. 102,239
Int. Cl. C08f 1/16, 7/12
U.S. Cl. 260—879
17 Claims

ABSTRACT OF THE DISCLOSURE

Quaternized, cross-linked, insoluble copolymers of unsubstituted and substituted vinyl pyridines and a dihalo organic compound are spontaneously formed at ambient temperature on mixing the two monomers in bulk, in solution or in suspension. The amount of cross-linking may be varied according to the composition and reaction conditions. The polymer product exhibits ion exchange capacity and undergoes a reversible color change from black at a pH above 7 to yellow at a pH below 7. The polymer may be formed in the presence of preformed polymers, substrates such as porous or impervious particles or films to deposit an ion exchange film in situ or on the surface of the substrate. The coated or resin impregnated substrate may be utilized for separation of anionic species from aqueous solution.

CROSS-REFERENCES TO RELATED APPLICATION

This application is a continuation-in-part of Ser. No. 763,938, filed Sept. 30, 1968 and now abandoned.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION (1) Field of the invention

The present invention relates to novel ion exchange resins, and, more particularly, to novel copolymers of vinyl pyridine and dihalo-compounds.

(2) Description of the prior art

Quaternary nitrogen containing materials being cationic in nature find many uses as ion exchange materials, germicidal agents and as conductive materials. However, many of the polymeric quaternary materials are of low molecular weight and are water soluble. There are numerous polyfunctional convalent molecules that have been utilized in the preparation of cross-linked viscoelastic polymers, but to date, spontaneously formed, cross-linked ionic compounds of the type described below have not been prepared.

SUMMARY OF THE INVENTION

In accordance with the invention, an in situ, spontaneous reaction between a vinyl pyridine and a dihalo organic compound results in a quaternized cross-linked, water insoluble polyelectrolyte polymer product having a variety of uses. The product can contain a selected, controlled distribution of positively charged cationic centers within the polymer chain and in bridges between the chains of three-dimensional product by appropriate selection of monomers. The polymer is prepared in high yield from readily available starting materials.

Since the reaction is spontaneous, there is no catalyst contamination, thus, avoiding complex and time consuming work up and purification of the product. The polymer products contain residual unsaturation which is available for further cross-linking by heat, radiation or free radical catalyst induced reaction.

These and many other attendant advantages of the invention will become apparent as the description proceeds.

The polyquaternary, water insoluble cross-linked materials of the invention are prepared by reacting a vinyl pyridine with a dihalo organic compound of the formula:

$$X—R_1—X$$

where X is halo, preferably bromo, chloro or iodo and $R_1$ is a divalent organic radical such as alkylene, alkenylene, alkynylene, arylene, alkarylene or aralkylene. $R_1$ may also be alkylthioalkylene or alkyloxyalkylene of the formula $(CH_2)_x(Z)_y(CH_2)_z$, where Z is oxygen or sulfur and $x$, $y$ and $z$ are integers from 1 to 100. $R_1$ may also be of prepolymer or polymeric length of from 20 to 500 or more carbon atoms such as a bromo-terminated polybutadiene, but, preferably has a carbon content of from 1 to 20 carbon atoms to provide an increased charge center density per unit volume and weight of the polymeric product. $R_1$ may be substituted with other groups that do not interfere with the polymerization reaction or properties of the polymer product such as hydroxyl, alkyl, aryl, nitro, cyano or similar groups.

Representative dihalo organic compounds are $\alpha,\omega$-alkylene or alkenylene halides such as dibromo methane, 1,2-dibromoethane, 1,3-dibromopropane, 1,4-dibromobutane, 1,4-dibromo-2-butene, 1,4-dichloro-2-butene, 1,4-dibromo-2,3-dihydroxy butane, 1,5-dibromopentane, 1,6-dibromohexane, 1,8-dibromooctane, 1,10-dibromodecane, and 1,16-dibromohexadecane. The alkenylene compounds such as 1,4-dibromobutene are found to be more reactive than the corresponding saturated compounds. Dihaloaromatics such as o, m and p-dichloro- or o, m and p-dibromoxylene are also suitable. Cross-linked, insoluble products would also be formed from terminally brominated prepolymers such as polyethylenes, polypropylenes, polybutylenes, polybutadienes, polyoxyethylene, etc. containing from about 20 to 500 or more carbon atoms. As the number of carbon atoms in the dihalide increases, elastomeric properties are favored and polyelectrolyte properties decrease.

The butadiene polymers utilized in the process of the invention such as the dibromo polymers discussed above should contain a minimum amount, suitably below 40%, of 1,2-addition units to avoid excessive decrease in elastomeric properties. Such polybutadienes are available as liquid polymers having a molecular weight from 2,000 to 10,000. A suitable material, Polysarrubber (Polysar Limited) is a brominated liquid polybutadiene having a molecular weight of about 5,000 and a functionality very near to two. Another suitable material is HYSTL polybutadiene (HYSTL Development Company, a subsidiary of TRW Inc., and Cores Inc.) or other prepolymers which can be terminated with halogens.

4-vinyl pyridine is the most reactive of the vinyl pyridine isomers. However, 2-methyl-5-vinyl pyridine is available at lower cost and provides products of similar properties. 2-vinyl pyridine has been found to be much less reactive than the other monomers.

The polycationic, cross-linked products are prepared simply by mixing the vinyl pyridine monomer with the dihalide in various proportions and allowing the mixture to react until solid materials are formed.

The reaction is believed to proceed through a first stage in which two molecules of vinyl pyridine react with a molecule of a dibromide to form a quaternary intermediate as illustrated below:

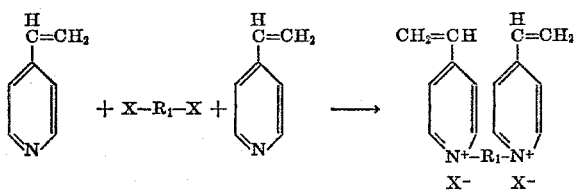

Two molecules of the intermediate dicationic, diunsaturated cross-linking agent then react through the vinyl group to form an intermediate having a structure of the formula:

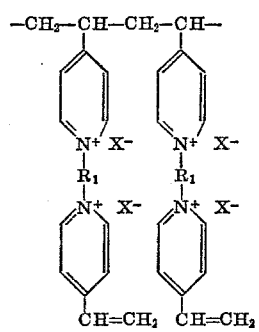

The intermediate reacts further to give a cross-linked network with residual unsaturation. Although, this mechanism is dominant, other intermediates are also formed. The reaction proceeds spontaneously at room temperature, about 25° C., but may be accelerated by heating the reaction to a higher temperature, usually below 100° C. and suitably from 25–60° C. The unsaturation on the growing polymer as well as on the finished resin may be utilized in further reaction, e.g. grafting onto substrates by means of Co$\gamma$ radiation.

Cross-linking of the product is also facilitated by irradiating the mixture with radiation capable of forming reactive species to cross-link the vinyl groups, suitably gamma radiation from a cobalt source source. The reaction may be conducted in bulk, in a solvent for the monomer or in water suspension. The reaction proceeds faster in bulk, but, yields are higher in solvents. Higher yields are favored in polar solvents such as dimethylsulfoxide, dimethylformamide, methanol, ethanol, or combinations thereof. Particularly, high yields have been obtained with a 1/1 volume mixture of dimethylformamide and methanol.

The rate of reaction is found to be much higher with bromides, as compared to the corresponding chlorides. The ratio of monomers is controlled such that there is an excess of dibromide in the mixture. A suitable ratio is a stoichiometric ratio of 2 mols of vinyl pyridine to at least 1 mol of the dibromide. It has been found that when the polymerization is conducted with an excess of vinyl pyridine, unchanged vinyl pyridine can be recovered. It has further been found that oxygen and carbon dioxide interfere, inhibit and slow the reaction. Also free radical inhibitors such as hydroquinone do not interfere or slow down the reaction rate. Higher polymerization rates are favored by conducting the reaction in an inert atmosphere such as nitrogen or by conducting the reaction in vacuum. The properties of the polymer products can be varied by using excess of dihalide. The resulting product in this case contains nonionic halogen capable of further reaction.

The properties of the polymer products can be further varied by conducting the polymerization in the presence of excess monomer and a molecule capable of mono- quaternization such as an alkyl or alkenyl halide, hydrogen halide, dimethylsulfate, etc. The amounts of the quaternizing species are varied in such a way as to maintain the proportions: 2 moles of vinyl pyridine to 1 mole of dihalide and, 1 mole of vinyl pyridine to 1 mole of quaternizing species. Thus, for a polymer formed from a mixture containing 1 mole of dihalide and 0.5 mole of quaternizing agent, 2.5 moles of vinyl pyridine are required. By varying these proportions, different amounts of cross-linking are obtained and the resulting resins differ mainly in their swelling properties.

Mixed polymer products may also be prepared by conducting the polymerization in the presence of a pre-formed anionically charged substrate. Water soluble polymers such as polystyrene sulfonate, vinyl sulfonate polymer, carboxyl substituted polymers or a polysaccharide polymeric material, such as heparin are rendered water insoluble by cross-linking in the presence of the vinyl pyridine and dihalo cross-linking reactants of the invention.

The polymerization may be conducted in situ or on the surfaces of polymeric films, filaments or fibrous materials, such as cloth or paper on the surfaces or within the pores of particles such as glass, clay, cement, sand, carbon black, alumina, silica gel, and the like which act as supports to form a material having a polyelectrolytic ion exchange surface. In particular, when paper is impregnated with the monomers of the invention, an ion exchange paper is produced. The ion exchange paper is usable as an indicator paper, since it undergoes a reversible color change from dark brown in presence of base to yellow in the presence of acid. The ion exchange paper may also be used for detection of ions such as phosphate, by a procedure to be described and may be used in electrophoretic separations in chromatography for analysis, detection and separation of ions or in the purification of process or water streams.

The invention will become better understood by reference to the following detailed description when considered in conjunction with the accompanying examples of practice. It is to be realized that these examples are presented solely for purposes of illustration and are not intended to limit the invention to the particular materials, procedures or conditions described. Numerous substitutions, alterations and modifications are possible without departing from the invention.

DESCRIPTION OF THE PREFERRED EMBODIMENTS

Example 1 (solution)

4-vinyl pyridine (5 g.) and 1,2-dibromoethane (4.48 g.) were dissolved in 1:1 DMF-methanol. The solution was left at room temperature for 10 days. The gel that formed was washed with methanol and water and the remaining solid was filtered and vacuum dried at 50° C. overnight. Yield of dry solid was 8.3 g. The exchange capacity of the ion exchange resin, mesh size 250–500, was determined in the following way. The resin, vacuum dried at 100° C. overnight, was placed in a buret. A solution of sodium hydroxide (100 ml. of 3 N) was passed through the resin. The latter was then washed with distilled water. The combined sodium hydroxide solution and water washings were acidified with HNO$_3$ to pH 6 and then diluted with distilled water to 250 ml. A 30 ml. aliquot was analyzed for bromine by the Mohr method. The exchange capacity was calculated in terms of milliequivalents of chloride per gm. of dry resin and was found to be 4.9 meq./g.

A series of polymers were prepared in 2:1 DMF/methanol solution, 4 molar in 4-vinyl pyridine and 2 molar in dibromide. The dibromide was placed in the reaction flask with a small quantity of the solvent. The vinyl pyridine was then added and the volume adjusted to 25 ml. with additional solvent. The reaction mixture was cooled, degassed and sealed under vacuum and maintained at 35° C. for three days. The yield of the various polymers is indicated in the following table.

TABLE 1

| Run No. | Dibromide | Yield, percent |
|---|---|---|
| 1 | Dibromomethane | 100 |
| 2 | 1,2-dibromoethane | 70 |
| 3 | 1,3-dibromopropane | 97 |
| 4 | 1,4-dibromobutane | 94 |
| 5 | 1,6-dibromohexane | 100 |
| 6 | 1,8-dibromooctane | 100 |

Example 2 (Bulk)

4-vinyl pyridine (21.03 g.) and 1,2-dibromoethane (18.79 g.) were mixed in bulk. The reaction mixture was cooled, degassed, sealed under vacuum and kept at 25° C. for two days. The resulting resin was powdered, stirred with a methanol-water mixture and filtered. The filtrate was washed with methanol, water and acetone. The resin was vacuum dried for four days at 100° C. Yield 21 g. Exchange capacity of resin determined as in Example 1 was 6.17 meq./g.

A series of polymers prepared in bulk from 21.03 g. of 4-vinyl pyridine and a varying amount of dibromide were reacted in a 50 ml. flask maintained at 35° C. The flask was cooled and degassed and maintained under high vacuum during polymerization. The polymer was separated and washed as in Example 2 and oven dried at 100° C. The amount of dibromide reactants and yields are presented in the following table.

TABLE 2

| Run No. | Dibromide | Amount, g. | Yield, percent |
|---|---|---|---|
| 1 | Dibromomethane | 17.4 | 51 |
| 2 | 1,2-dibromoethane | 18.8 | 51 |
| 3 | 1,3-dibromopropane | 20.2 | 70 |
| 4 | 1,4-dibromobutane | 21.6 | 80 |
| 5 | 1,6-dibromohexane | 24.4 | 79 |
| 6 | 1,8-dibromooctane | 27.2 | 90 |

Another series of polymers were prepared according to the procedure of Example 2. Swelling tests were carried out by placing the polymer on a screen in a closed desiccator containing a reservoir of water and weighing the polymer after 14 hours exposure to water vapor to determine percent increase in weight. The exchange capacities and swelling of the polymers are listed in the following table.

TABLE 3

| Run No. | Dibromide | Exchange capacity, meq./g. | Swelling percent increase in weight |
|---|---|---|---|
| 1 | Dibromomethane | 4.06 | |
| 2 | 1,2-dibromoethane | 6.17 | |
| 3 | 1,3-dibromopropane | 4.52 | 67.1 |
| 4 | 1,4-dibromobutane | 4.59 | 58.0 |
| 5 | 1,6-dibromohexane | 3.11 | |
| 6 | 1,8-dibromooctane | 2.37 | 47.8 |
| 7 | 1,16-dibromohexadecane | 2.14 | |
| 8 | 1,4-dibromo-2-butene | 4.17 | 68.1 |
| 9 | 1,4-dibromo-2,3-dihydroxybutane | 5.8 | |

The exchange capacities and swelling measurements indicate that the polymers will perform favorably as an ion exchange material.

Example 3

A mixture of 4-vinyl pyridine (5 g.) 1,2-dibromoethane (4.47 g.) was irradiated in a Co-γ source (0.9 mr./hour) at room temperature and at atmospheric pressure. At the end of 24 hours, a dark hard resin was produced. The powdered resin was washed with water and methanol. Weight of dry resin: 9 g. Ion exchange capacity 4.5 meq./g.

Example 4 (suspension)

4-vinyl pyridine (5 g.), 1,6-dibromohexane (5.8 g.) and KBr (5 g.) were stirred in distilled water (30 ml.) at 50° C. for three days. The suspended solids were filtered, washed with methanol and acetone. Yield of resin after vacuum drying at 65° C. for 2 days was 5.3 g.

Example 5

5 g. (0.0476 mol) of 4-vinyl pyridine and 6.28 g. (0.0238 mol) of α,α'-dibromo-p-xylene were mixed in 5 ml. DMF, 15 ml. MeOH, and 30 ml. benzene. The solution turned red in color, and gelled in 30 minutes. The resin was isolated after one day and then crushed, washed with MeOH, water and acetone. The resin was then filtered and vacuum dried at 70° C. for 2 days. Yield 11.09 g.

Example 6

3 g. of 4-vinyl pyridine and 3.057 g. of 1,4-dibromo-2-butene were mixed in 5 ml. of 1/1 DMF/MeOH. The resin was isolated after five days, crushed, washed with MeOH, filtered, and vacuum dried at 100° C. Yield 6.08 g. The observed exchange capacity was 4.70 meq./g.

Example 7

4-vinyl pyridine (5 g.), allyl bromide (2.88 g.) and 1,4-dibromo-2-butene (2.55 g.) were dissolved in 15 ml. of a 1/1 volume mixture of methanol-dimethylformamide. The mixture gelled seven minutes and was left standing at room temperature for 24 hours. After thorough washing with methanol and drying, 91.9 g. of water insoluble resin was obtained. Exchange capacity 5.0 meq./g.

Example 8

4-vinyl pyridine (10 g.) allyl bromide (11.06 g.) and 1,4-dibromo-2-butene (0.408 g.) were dissolved in 30 ml. of 1/1 volume dimethylformamide methanol. The mixture was left at room temperature for three days and at the end of this time the reaction product was stirred with methanol, filtered and dried at 50° C. under vacuum for 24 hours. Yield: 19 g. of a water insoluble but highly swellable resin.

Samples of the ion exchange resins of Examples 6 (no allyl bromide), 7 (small amount of allyl bromide) and 8 (a large amount of allyl bromide) were sieved to form equal volume samples of 50 mesh particle size. The samples were immersed in water and the volume of each sample was determined after equilibrium, i.e., after no more swelling of the sample was evident. The sample of Example 6 evidenced swelling increase of only 75% while the sample of Example 7 showed a 240% increase and the sample of Example 8 a 800% increase. These experiments demonstrate the highly cross-linked nature of the ion exchange resin of the invention and the relative ability of monoquaternizing reagents to decrease the amount and degree of cross-linking and increase the swelling characteristics of the resins.

Example 9

4-vinyl pyridine (2.0 g.), 1,4-dibromo-2-butene (2.04 g.) and polystyrene (5 g.) having a weight average molecular weight approximately 300,000 were dissolved in a mixture of benzene (20 mol) and dimethylformamide (10 ml.). After standing at ambient temperature for 24 hours, the mixture was precipitated with methanol (500 mol), filtered and dried in a vacuum oven at 50° C. for 24 hours. Dry weight 8.5 g. The powdery material yielded a film at 110° C. under pressure. The polystyrene could be recovered unchanged by extraction with benzene leaving an ion exchange resin as a residue. Ion exchange capacity of the residual resin: 4.2 meq./g.

Example 10

5 g. of 2-methyl-5-vinyl pyridine and 4.5 g. of 1,4-dibromo-2-butene were mixed in 20 ml. of 1/1 DMF/MeOH. A precipitate was isolated after 5 days, on addition of acetone washed with ether and vacuum dried at room temperature. Yield 8.46 g. The product is a divinyl, dicationic, water soluble compound that slowly cross-links at room temperature and at a faster rate at higher temperature.

Example 11

2-methyl-5-vinyl pyridine (23.8 g.) and 1,2-dibromomethane (18.8 g.) dissolved in 200 ml. of a 1/1 volume mixture of dimethylformamide and methanol was heated to boiling and refluxed for 12 hours. After evaporation of the solvent under vacuum a cross-linked resin was obtained. It was washed with acetone and water and dried in vacuum oven at 50° C. for 24 hours. Yield of dry water insoluble resin 37.86 g. Exchange capacity 4.9 meq./g.

Example 12

Example 11 was repeated, except that the dihalide was 1,10-dibromodecane (30 g.). Yield of dry, water insoluble resin 53.9 g. Exchange capacity 3.3 meq./g.

Example 13

4 g. of 4-vinyl pyridine, 4.47 g. of 1,2-dibromoethane, and 40 g. of Ottawa sand (250–500 mesh) were thoroughly mixed. The sample was irradiated in a Cobalt-60 source for 16 hr. (0.9 mr./hour). The sample was then crushed and washed with MeOH, 1 N HBr, and $H_2O$; filtered and vacuum dried at 80° overnight. Exchange capacity of the sand after treatment was $$\frac{0.44 \text{ meq.}}{\text{g. sand}}$$

Analysis by an electron scanning microscope showed reasonably uniform resin coating of the sand particles.

Example 14

5 pieces of circular Whatman #1 filter paper (diameter 4.25 cm.) were soaked for 2 hours in a bulk solution of 4-vinyl pyridine and 1,2-dibromoethane freshly prepared according to Example 2. The papers were then placed in a closed vessel and left standing at ambient condition for five days. The samples were then washed with 1 N NaOH, 1 N HBr, $H_2O$ and MeOH (3 times) and then vacuum dried at 40° C. for 24 hours. Average increase in weight due to impregnation of paper with resin was 800 mg. per sheet of filter paper. The amount of resin in the paper after washing and drying was 5.6 mg./cm.$^2$ (average of four experiments). The exchange capacity was found to be $3.6 \times 10^{-2}$ meq./cm.$^2$. The electrical resistance of the wet ion exchange paper at pH 7 was one onder of magnitude lower than the electrical resistance of a wet filter paper of identical dimensions indicating the possibility of electrophoretic analysis.

Example 15

3.42 g. of 1,4-dichloro-2-butene and 6.73 g., of 4-vinyl pyridine were stirred in presence of distilled water (70 ml.) for 2 hours. The gel that formed was kept at room temperature for 16 hours. Addition of acetone filtration and drying at 50° C. in vacuum for 24 hours yielded 10.6 g. of water insoluble resin.

Example 16

A polymer was prepared by mixing 55.0 g. (0.5 mol) of 4-vinyl pyridine with 50 g. (0.25 mol) of 1,3-dibromopropane in 100 ml. of 1/1 DMF/MeOH to which was added a small amount of hydroquinone. A water insoluble polymer formed spontaneously. Yield of dry resin was 95% of the theoretical amount.

Example 17

Ten grams of dibromopolybutadiene having a molecular weight of approximately 5000 and a bromine content of 3.2% were intimately mixed with 2 g. of 4-vinyl pyridine. The mixture was cast onto a glass plate. A rubbery sheet was produced within 24 hours at room temperature. The material was cross-linked as shown by a measurement of dynamic modulus versus temperature. The value of dynamic modulus was constant in the temperature range of $-25°$ C. to 100° C. and equal to $10^7$ dynes/cm.$^2$. These properties prove that a cross-linked product was formed. The glass transition temperature of the elastic product was found to be approximately $-80°$ C.

Example 18

Ten grams of the dibromopolybutadiene of Example 14 was mixed with 2 g. of 4-vinyl pyridine and 5 g. of ammonium perchlorate in a glass container. A salt-filled rubbery product was formed within 24 hours.

An interesting use of the cross-linked elastomeric product (dibromo polybutadiene+4 vinyl pyridine) is the encapsulation of heat sensitive reactive materials such as the explosive materials illustrated in Example 18. This demonstrates that a product of this invention may be used as an organic binder for ammonium perchlorate. This application of the resin products of the invention is attractive since the reaction proceeds without increasing the temperature of the mixture. Thus, formation of solid propellants is less hazardous than in the presently used techniques.

Example 19

The mixture of Example 18 was prepared with a filler consisting of carbon black. A carbon black reinforced rubber was produced.

Example 20

4-vinyl pyridine (5 g.), 1,6 - dibromohexane (5.8 g.) and sodium polystyrene sulfonate (8.7 g.) were stirred in distilled water (65 ml.) for three days. The solid produced was filtered, thoroughly washed with methanol and acetone and vacuum dried for two days at room temperature. Dry weight of a pink powder: 11.5 g. containing 4.02% sulfur.

Example 21

4-vinyl pyridine (5 g.), 1,3 - dibromo-2,3-butanediol (5.9 g.) were mixed in DMF/MeOH (1:4) and left at room temperature for 3 weeks. The solid resin which formed was crushed and washed with methanol and water. Weight of isolated dry resin 6.2 g. Exchange capacity 6.3 meq./g.

The resins of the invention are well suited for use as ion exchange materials since they are water insoluble, three dimensional cross-linked materials. Swelling and ion exchange capacity measurements indicate that the materials will expand sufficiently to expose the quaternary sites and to allow the solution being treated to penetrate into the material. The ion exchange capacity compares favorably to available materials and the material can be regenerated by conventional base treatment to elute the bound anions and return the paper or column to basic form.

The ion exchange paper will also find use in paper chromatographic separation of a wide variety of materials. Both quantitative and qualitative information is obtainable from the spot size, spot location and length of elution. The resin of the invention may be utilized as an acid-base indicator particularly, when supported on a porous substrate such as paper. The indicator paper would be suitable as a disposable body fluid analysis paper or may be rinsed and repeatedly utilized for analysis since the color change is reversible. A supported film is also useful for imaging by selective application of a pattern of acid or base to the material to develop a contrastingly colored pattern with respect to the background. The pattern can be erased by application of acid or base as is required.

The ion exchange material of the invention may also be utilized for detection of ions. For example, when ion exchange paper is dipped in a dilute aqueous solution of sodium phosphate (8 p.p.m.), washed with water and treated with ammonium molybdate followed by stannous chloride, a blue color is developed which indicates the presence of small amounts of phosphate in water.

Beads or particles of the ion-exchange material efficiently remove phosphate ions from aqueous solution. One-half gram samples of resin prepared in accordance with Table 2 were utilized to remove phosphate ion from an aqueous solution.

The results are tabulated below:

Table 4

| Run No.: | Percent removal of phosphate |
|---|---|
| 1 | 45.2 |
| 2 | 53.5 |
| 3 | 75.6 |
| 4 | 8.3 |
| 5 | 22.9 |
| 6 | 11.5 |

A wide variety of resins of controllably differing properties is produced by appropriate selection of dihalide. The spacing between positive nitrogen atoms may readily be varied in order to render the resin selective for specific anions. The resins are useful in chromatography, in analysis, detection and separation of ions, as ion exchange particles or membranes, as acid-base indicators or in acid-base imaging.

It is to be realized that only preferred embodiments of the invention have been described and that numerous substitutions, alterations and modifications are all permissible without departing from the spirit and scope of the invention as defined in the following claims.

What is claimed is:

1. A polyquaternary, water-insoluble, water-swellable, cross-linkable polymer of vinyl pyridine and a dihalo organic compound of the formula:

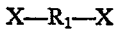

where X is halo selected from the group consisting of bromo, chloro and iodo and $R_1$ is a divalent organic radical containing 1-20 carbon atoms and being selected from the group consisting of alkylene, alkenylene, alkynylene, arylene, alkarylene and aralkylene; said polymer containing a plurality of structural units of the formula:

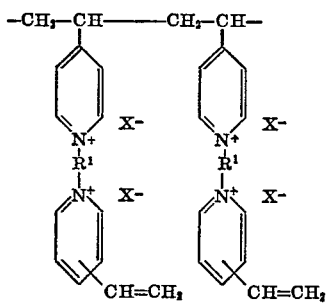

the ratio of $X^-$ to $N^+$ atoms being essentially stoichiometric, the polymer containing residual unsaturation capable of further reaction and the polymer undergoing a reversible color change above and below a pH of 7.

2. A polyquaternary, water-insoluble, water-swellable, cross-linkable, elastomeric polymer of vinyl pyridine and a dihalo organic compound of the formula:

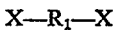

where X is halo selected from the group consisting of bromo, chloro and iodo and $R_1$ is a divalent polybutadiene containing 20–500 carbon atoms; said polymer containing a plurality of structural units of the formula:

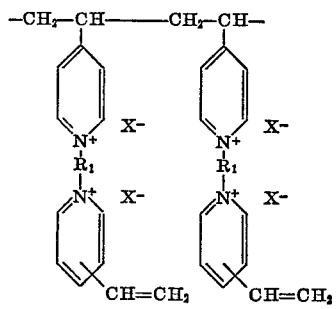

the ratio of $X^-$ to $N^+$ atoms being essentially stoichiometric, the polymer containing residual unsaturation capable of further reaction and the polymer undergoing a reversible color change above and below a pH of 7.

3. A polymer according to claim 1 in which X is bromo and $R_1$ contains 1 to 20 carbon atoms, said polymer having an ion exchange capacity from about 4.06 to about 6.3 meq./grams.

4. A polymer according to claim 3 in which $R_1$ is alkenylene.

5. A polymer according to claim 1 in which the vinyl pyridine is a 4-vinyl pyridine.

6. A method of forming a water-insoluble, water-swellable, three dimensional cross-linked, polyquaternary polymer comprising the steps of:

mixing at a temperature of no more than 100° C. a vinyl pyridine with at least a stoichiometric amount of a dihalo organic compound of the formula:

where X is halo selected from the group consisting of bromo, chloro and iodo and $R_1$ is a divalent organic radical selected from the group consisting of alkylene, alkenylene, alkynylene, arylene, alkarylene and aralkylene;

said mixture inherently polymerizing in the absence of catalyst to form a solid, water-insoluble, cross-linked product; and recovering the product.

7. A method according to claim 6 in which the temperature is from 25° C. to 60° C.

8. A method according to claim 6 in which radiation is applied to the mixture during polymerization.

9. A method according to claim 8 in which the radiation is gamma radiation from a cobalt source.

10. A method according to claim 6 in which the polymerization reaction is conducted in bulk.

11. A method according to claim 6 in which the reaction is conducted in the presence of a polar diluent selected from the group consisting of water and organic polar solvents.

12. A method according to claim 11 in which the polar solvent is at least one member selected from the group consisting of dimethylsulfoxide, dimethylformamide, methanol and ethanol.

13. A method according to claim 6 in which the mixture contains a stoichiometric excess of dihalo compound.

14. A method according to claim 6 in which the polymerization reaction is conducted in the presence of an inert atmosphere.

15. A method according to claim 6 in which the vinyl pyridine is 4-vinyl pyridine.

16. A method according to claim 15 in which X is bromo and $R_1$ contains 1 to 20 carbon atoms.

17. A method according to claim 6 including the step of adding a monoquaternizing reagent and an additional amount of vinyl pyridine in an amount equivalent to the reagent to said mixture to decrease the degree of cross-linking and increase the degree of swellability of said product.

References Cited

UNITED STATES PATENTS

| | | | |
|---|---|---|---|
| 2,723,258 | 11/1955 | Price | 260—80.72 |
| 2,848,442 | 8/1958 | Svetlik | 260—82.1 |
| 2,851,450 | 9/1958 | Pritchard | 260—88.3 |
| 2,946,757 | 7/1960 | Butler | 260—2.1 |
| 2,946,758 | 7/1960 | Zenftman | 260—2.1 |
| 2,955,093 | 10/1960 | Solomon | 260—23.7 |
| 2,970,132 | 1/1961 | Reynolds | 260—86.1 |
| 3,574,177 | 4/1971 | Nakajima | 260—88.7 |

JAMES A. SEIDLECK, Primary Examiner

C. A. HENDERSON, Jr., Assistant Examiner

U.S. Cl. X.R.

23—230 R; 117—123 D, 132 R, 155 UA, 161 UA; 204—159.14, 159.17, 159.22